United States Patent Office 2,783,240
Patented Feb. 26, 1957

2,783,240

HETEROCYCLIC SULFONAMIDES

James Robert Vaughan, Jr., Darien, Kathryn Helen Wood, Old Greenwich, and Richard William Young, Riverside, Conn., assignors to American Cyanamid Company, New York, N. Y., a corporation of Maine No Drawing. Application March 4, 1955,
Serial No. 492,296

8 Claims. (Cl. 260—306.8)

This invention relates to a new series of organic compounds. More particularly, this invention is concerned with a novel group of 2-(N-acyl-N-substituted amino)-1,3,4-thiadiazole-5-sulfonamides and methods for their preparation.

The usefulness of sulfonamide drugs has recently been extended by the discovery of Clapp and Roblin (U. S. Patent No. 2,554,816) that certain heterocyclic sulfonamides are desirable diuretic agents because of their ability to inhibit carbonic anhydrase. This enzyme catalyses the conversion of carbon dioxide and water to carbonic acid, which then ionizes to form the hydrogen ion and the bicarbonate ion. The hydrogen ions so formed replace the sodium in the bicarbonate and phosphate buffers naturally present in the body. This causes sodium conservation in the renal tubules and thus saves fixed base.

In certain disease states such as congestive heart failure, there is an excessive retention of sodium ions and water in the body causing an abnormal fluid accumulation commonly referred to as edema. In such conditions, the administration of a carbonic anhydrase inhibitor prevents renal excretion of hydrogen ions and increases renal excretion of sodium ions, thus relieving the edema.

The heterocyclic compounds of Clapp and Roblin, particularly the 2-substituted-1,3,4-thiadiazole-5-sulfonamides, are capable of inhibiting the activity of carbonic anhydrase and are useful in the treatment of pathological conditions associated with fluid retention. In this regard, the compound 2-acetylamino-1,3,4-thiadiazole-5-sulfonamide, available commercially under the trademark "Diamox," has been of particular interest. From the clinical standpoint, it is a highly desirable diuretic agent, being orally administrable, non-mercurial and non-toxic.

Investigations have been conducted recently to extend the usefulness of such compounds to other diseases related to the carbonic anhydrase-edema syndrome. Since it is known that both the ciliary process of the eye (where the ocular fluid is formed), and the brain contain carbonic anhydrase, serious consideration has been given to the applicability of heterocyclic sulfonamides in the treatment of glaucoma and epilepsy. A necessary difficulty to be overcome in the successful treatment of these diseases is the penetration of the blood:ocular fluid and blood:brain barriers in order to effect a carbonic anhydrase inhibitory concentration of the drub in the ocular fluid (glaucoma) and the brain (epilepsy).

We have now discovered a series of compounds which possess unusual pharmacological properties. These compounds have superior penetration into the brain and the eye, and last longer in the body than compounds of related chemical structure. When administered orally they are capable of relieving the symptoms associated with glaucoma and epilepsy with minimal side effects and toxic manifestations.

The compounds of our invention may be represented by the following general formula:

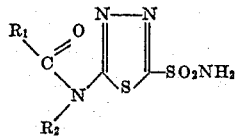

wherein $R_1$ and $R_2$ represent, interchangeably, a lower alkyl, monocyclic aralkyl or monocyclic aryl radical. As examples of suitable lower alkyl substituents may be given those containing from 1 to 10 carbon atoms, as for example, methyl, ethyl, propyl, isopropyl, n-butyl, isobutyl, pentyl, amyl, hexyl, heptyl, octyl, nonyl, and decyl. Suitable aralkyl substituents are benzyl, α-phenethyl, β-phenethyl, phenylpropyl, phenylbutyl and tolylmethyl. Aryl radicals may be exemplified by phenyl and substituted phenyl, suitable substituents on the phenyl ring being —Cl, —F, —Br, —I, —NO₂, lower alkyl radicals containing from 1 to 5 carbon atoms, alkoxy groups such as —OCH₃, —OC₂H₅, —OC₃H₇, —OC₄H₉, —OC₅H₁₁ and

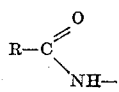

groups wherein R is a lower alkyl radical from 1 to 5 carbon atoms. Other suitable substituents within the scope represented by the general formula will readily occur to those skilled in the art.

A preferred method for preparing the compounds of this invention is a 2-step process comprising chlorination of the 2-(N-acyl-N-substituted amino)-5-mercapto-1,3,4-thiadiazole followed by amidation of the resulting sulfonyl chloride derivative to obtain the desired product. The starting material is suspended in an aqueous acid solution and the chlorine gas is passed in. The intermediate sulfonyl chloride derivative, separated by filtration or extraction into a suitable solvent, preferably ether, is then treated with ammonia to produce the desired sulfonamide.

The chlorination step is carried out for a period of time sufficient to permit completion of the reaction, an excess of chlorine in the reaction mixture being an adequate indication of such conversion. An aqueous solution of acetic acid is preferred as a reaction medium for the mercapto derivative although other fatty acids, such as formic, propionic or butyric or dilute mineral acids such as hydrochloric, sulfuric or phosphoric, may be employed with equally satisfactory results. The preferred temperature during chlorination is −10° C. to 25° C.

The sulfonyl chloride derivative is preferably converted to the corresponding sulfonamide by treatment with an excess of ammonia in the form of liquid ammonia or as liquid ammonium hydroxide. After a period of about 15 minutes to 2 hours, the excess ammonia is removed by evaporation and the final product is separated, purified and crystallized.

The following examples are intended to illustrate our invention. They are not intended however, to limit the scope thereof, nor to restrict the type of compounds which may be prepared to those which are specifically exemplified. All parts are by weight unless otherwise indicated.

Example I 31.4 parts by weight of 4-phenylthiosemicarbazide were slurried with 300 parts by volume of ethyl alcohol. There where then added 12.4 parts by weight of 85% potassium hydroxide and 12 parts by volume of water. A clear solution resulted. There was then added 14.5 parts by volume of carbon disulfide and the mixture was refluxed for a period of about 12 hours. The alcoholic solution was concentrated, the residue was taken up in a small volume of water and acidified with hydrochloric acid. The precipitate of 2-phenylamino-5-mercapto-1,3,4-thiadiazole was separated by filtration (M. P. 220° C.). 2.04 parts by weight of this compound in 5 parts by volume of acetic anhydride containing 0.12 part by volume of sulfuric acid was heated on a steam bath for a period of about 2 hours. A 10 parts by volume quantity of water was added, and the mixture was refluxed for about 5 minutes. The solid 2-(N-acetyl-N-phenylamino)-5-mercapto-1,3,4-thiadiazole was removed by filtration. A 2.5 parts by weight quantity of this compound was suspended in 30 parts by volume of 33% acetic acid and chlorine was then bubbled through the mixture with stirring and cooling for 1 hour. The insoluble intermediate 2-(N-acetyl-N-phenylamino)-1,3,4-thiadiazole-5-sulfonyl chloride so formed was filtered off, washed with water, an recrystallized from ethyl ether.

2.4 parts by weight of this intermediate product was added to 10 parts by volume of liquid ammonia. The excess ammonia was removed by distillation and the colorless residue was redissolved in 125 parts by volume of ice water. Acidification of this solution precipitated the product 2-(N-acetyl-N-phenylamino)-1,3,4-thiadiazole-5-sulfonamide which was purified by crystallization from 150 parts by volume of 90% ethanol followed by recrystallization from 200 parts by volume of absolute ethanol. The product, representing a 57% yield, had a melting point of 236° C. to 237° C.

*Example II*

A quantity of methylthiosemicarbazide was cyclized in the presence of alcoholic potassium hydroxide, carbon disulfide and water in accordance with the process set forth in Example I, to yield 2-methylamino-5-mercapto-1,3,4-thiadiazole. To a quantity of this compound there was then added acetic anhydride acidified with sulfuric acid. The mixture was heated on a steam bath and then refluxed (as shown in Example I) to yield the solid 2-(N-acetyl-N-methylamino)-5 - mercapto - 1,3,4 - thiadiazole which was removed by filtration.

An 18.6 parts by weight sample of this product was suspended in 300 parts by volume of 33% acetic acid and chlorine was then bubbled through the mixture with stirring and cooling for 1 hour. The insoluble 2-(N-acetyl-N-methylamino) - 1,3,4 - thiadiazole - 5 - sulfonyl chloride so formed was then filtered off, washed with water, and recrystallized from ethylene chloride-petroleum ether as colorless plates.

A 16 parts by weight sample of the above sulfonyl chloride was added portionwise to about 50 parts by volume of liquid ammonia. The excess ammonia was removed by distillation and the colorless residue was redissolved in 125 parts by volume of ice water. Acidification of this solution precipitated the product 2-(N-acetyl-N-methylamino)-1,3,4-thiadiazole - 5 - sulfonamide as a colorless solid. This was filtered off, washed with water and recrystallized from 500 parts by volume of hot water, M. P. 216° C. to 217° C.

*Example III*

A quantity of ethylthiosemicarbazide was cyclized in the presence of alcoholic potassium hydroxide, carbon disulfide and water in accordance with the process set forth in Example I to yield 2-ethylamino-5-mercapto-1,3,4-thiadiazole. To a quantity of this compound there was then added acetic anhydride acidified with sulfuric acid and the mixture was treated as shown in Example I to yield the solid 2-(N-acetyl-N-ethylamino)-5-mercapto-1,3,4-thiadiazole which was removed by filtration.

A 6.1 parts by weight sample of this product was suspended in 150 parts by volume of 33% acetic acid and treated with chlorine as in Example I. The insoluble sulfonyl chloride derivative was filtered off, washed with water and recrystallized from a mixture of ethyl acetate and petroleum ether. A 5.6 parts by weight sample of the 2 - (N - acetyl - N - ethylamino) - 1,3,4 - thiadiazole-5-sulfonyl chloride was then added portionwise to about 25 parts by volume of liquid ammonia and the excess ammonia was removed by distillation. The residue was redissolved in 100 parts by volume of cold water and the product was precipitated by acidification with hydrochloric acid. Recrystallization from 600 parts by volume of hot water gave the product 2-(N-acetyl-N-ethylamino)-1,3,4-thiadiazole-5-sulfonamide as colorless crystals, M. P. 231° C. to 232° C.

*Example IV*

A quantity of n-butylthiosemicarbazide was cyclized in the presence of alcoholic potassium hydroxide, carbon disulfide and water in accordance with the process set forth in Example I to yield 2-n-butylamino-5-mercapto-1,3,4-thiadiazole. To a quantity of this compound there was then added acetic anhydride acidified with sulfuric acid and the mixture was treated as shown in Example I to yield the solid 2-(N-acetyl-N-n-butylamino)-5-mercapto-1,3,4-thiadiazole which was removed by filtration.

A 2.3 parts by weight sample of this product was treated with chlorine as shown in Example I. The intermediate sulfonyl chloride was obtained as an oil which was taken up in ether, dried and added directly to liquid ammonia. After removal of the excess ammonia and solvent, the residue was redissolved in cold water as shown in Example I and the solution acidified to precipitate the crude product 2-(N-acetyl-N-n-butylamino)-1,3,4-thiadiazole-5-sulfonamide. Crystallization from a mixture of ethyl acetate and petroleum ether yielded the pure product, M. P. 169° C. to 170° C.

*Example V*

A quantity of methylthiosemicarbazide is cyclized to 2-methylamino-5-mercapto-1,3,4 - thiadiazole (Examples I and II). To a quantity of this compound there was then added propionic anhydride acidified with sulfuric acid and the mixture was treated as shown in Example I to yield the solid 2-(N-methyl-N-propionylamino)-5-mercapto-1,3,4-thiadiazole.

A 2.6 parts by weight sample of this product was then suspended in 60 parts by volume of 33% acetic acid and treated with chlorine as shown in Example I. The solid sulfonyl chloride derivative was filtered off, washed with water and redissolved in a mixture of ethyl acetate (40 parts by volume) and petroleum ether (200 parts by volume). After drying this solution, 10 to 15 parts by volume of liquid ammonia was added to cause the precipitation of a white solid. This was removed and redissolved in water. On acidification of this solution, the crude 2 - (N-methyl-N-propionylamino)-1,3,4-thiadiazole-5-sulfonamide precipitated. This was purified by crystallization from 150 parts of hot water followed by recrystallization from two 50 parts by volume portions of absolute ethanol, M. P. 204° C. to 205° C.

The following listed compounds may be prepared by following the procedures described in the preceding examples. The appropriate thiosemicarbazide is cyclized to the corresponding 2-substituted-amino-5-mercapto-1,3,4-thiadiazole which is then acylated to yield the corresponding 2-(N-acyl-N-substituted amino)-5-mercapto-1,3,4-thiadiazole. The sulfonamide is obtained by treating the mercapto derivative with chlorine and then amidating the resulting intermediate sulfonyl chloride derivative.

2 - (N - acetyl - N - methylamino)-1,3,4-thiadiazole-5-sulfonamide 2-(N-propionyl - N - methylamino)-1,3,4-thiadiazole-5-sulfonamide 2-(N-butyryl - N - methylamino)-1,3,4-thiadiazole-5-sulfonamide 2-(N-isobutyryl - N - methylamino)-1,3,4-thiadiazole-5-sulfonamide 2-(N-acetyl - N - butaylamino)-1,3,4-thiadiazole-5-sulfonamide
2-(N-propionyl - N - butylamino)-1,3,4-thiadiazole-5-sulfonamide
2-(N-propionyl - N - ethylamino)-1,3,4-thiadiazole-5-sulfonamide
2-(N-propionyl - N - propylamino)-1,3,4-thiadiazole-5-sulfonamide
2-(N-amyl - N - butyrylamino)-1,3,4-thiadiazole-5-sulfonamide
2-(N-benzoyl - N - phenylamino)-1,3,4-thiadiazole-5-sulfonamide
2-(N-n-butyryl - N - p - chlorophenylamino)-1,3,4-thiadiazole-5-sulfonamide
2-(N-hexanoyl - N - β-phenethylamino)-1,3,4-thiadiazole-5-sulfonamide
2-(N-p-acetylaminophenyl - N - n - butyrylamino)-1,3,4-thiadiazole-5-sulfonamide
2-(N-hexyl - N - p-nitrobenzoylamino)-1,3,4-thiadiazole-5-sulfonamide
2-(N-ethyl - N - m-nitrobenzoylamino)-1,3,4-thiadiazole-5-sulfonamide
2-(N-acetyl - N - m-nitrophenylamino)-1,3,4-thiadiazole-5-sulfonamide
2-(N-o-chlorobenzoyl - N - tolylmethylamino)-1,3,4-thiadiazole-5-sulfonamide
2-(N-nonyl - N - o-acetaminobenzoylamino)-1,3,4-thiadiazole-5-sulfonamide
2-(N-m-nitrobenzoyl - N - α-phenethylamino)-1,3,4-thiadiazole-5-sulfonamide
2-(N-2,3-dichlorobenzyl - N - phenacetylamino)-1,3,4-thiadiazole-5-sulfonamide

We claim:
1. A compound selected from the group consisting of those having the general formula:

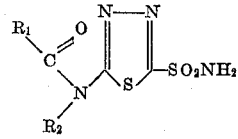

wherein $R_1$ and $R_2$ represent, interchangeably, a member selected from the group consisting of lower alkyl, monocyclic aralkyl and monocyclic aryl radicals.
2. The 2-(N-acyl - N-lower alkylamino)-1,3,4-thiadiazole-5-sulfonamides.
3. The 2-(N-acyl-N-monocyclic arylamino)-1,3,4,-thiadiazole-5-sulfonamides.
4. The compound 2-(N-acetyl-N-phenylamino)-1,3,4-thiadiazole-5-sulfonamide.
5. The compound 2-(N-acetyl-N-methylamino)-1,3,4-thiadiazole-5-sulfonamide.
6. The compound 2-(N-acetyl-N-ethylamino)-1,3,4-thiadiazole-5-sulfonamide.
7. The compound 2-(N-acetyl-N-n-butylamino)-1,3,4-thiadiazole-5-sulfonamide.
8. The compound 2-(N-methyl - N - propionylamino)-1,3,4-thiadiazole-5-sulfonamide.

References Cited in the file of this patent
UNITED STATES PATENTS

| | | |
|---|---|---|
| 2,554,816 | Clapp et al. | May 29, 1951 |
| 2,708,670 | Horclois et al. | May 17, 1955 |